United States Patent
Macher et al.

(10) Patent No.: US 6,286,983 B1
(45) Date of Patent: Sep. 11, 2001

(54) MIRROR HAVING AN ILLUMINATED FILM FOR SIGNALING AND GENERAL ILLUMINATION

(76) Inventors: David Macher, Maigasse 8, A-8570 Voitsberg (AT); Heinz Zorn, Hof 285, A-8063 Eggersdorf (AT)

( * ) Notice: Subject to any disclaimer, the term of this patent is extended or adjusted under 35 U.S.C. 154(b) by 0 days.

(21) Appl. No.: 09/378,284

(22) Filed: Aug. 20, 1999

Related U.S. Application Data (62) Division of application No. 08/972,915, filed on Nov. 18, 1997.

(30) Foreign Application Priority Data

Oct. 13, 1997 (AT) .................................................. A97/01730

(51) Int. Cl.⁷ ................................................................. G09G 3/12
(52) U.S. Cl. ........................... 362/487; 362/369; 362/390; 362/84; 362/135; 362/494; 362/492; 362/540; 340/475; 315/169.3
(58) Field of Search ................................ 362/369, 390, 362/84, 135, 494, 492, 540; 340/475; 315/169.3, 77, 82, 200 A (56) References Cited

U.S. PATENT DOCUMENTS

| | | | |
|---|---|---|---|
| 3,344,269 | * 9/1967 | Brown | 362/84 |
| 4,947,296 | 8/1990 | Takeuchi et al. | 362/135 |
| 4,979,079 | 12/1990 | Tawaraya | 362/135 |
| 5,059,015 | * 10/1991 | Tran | 362/83.1 |
| 5,175,528 | * 12/1992 | Choi et al. | 340/331 |
| 5,434,013 | 7/1995 | Fernandez | 428/690 |
| 5,482,614 | 1/1996 | Kondo et al. | 205/171 |
| 5,570,945 | 11/1996 | Chien et al. | 362/84 |
| 5,620,348 | * 4/1997 | Santana et al. | 362/84 |
| 5,764,141 | * 6/1998 | Chang | 340/472 |
| 5,788,357 | * 8/1998 | Muth et al. | 362/487 |
| 5,818,174 | * 10/1998 | Ohara et al. | 315/169.3 |
| 5,876,106 | * 3/1999 | Kordecki | 362/29 |
| 5,982,105 | * 11/1999 | Maters | 315/169.3 |
| 6,037,865 | * 3/2000 | Heinz et al. | 340/468 |
| 6,056,425 | * 5/2000 | Appleberg | 362/493 |
| 6,079,839 | * 6/2000 | Leibe | 362/31 |
| 6,121,943 | * 9/2000 | Nishioka et al. | 345/76 |
| 6,124,647 | * 9/2000 | Marcus et al. | 307/10.1 |
| 6,172,613 | * 1/2001 | DeLine et al. | 340/815.4 |
| 6,175,191 | * 1/2001 | Yamazaki | 315/169.3 |

\* cited by examiner

Primary Examiner—Stephen Husar
Assistant Examiner—Anabel M. Ton
(74) Attorney, Agent, or Firm—Clark Hill PLC (57) ABSTRACT

An external mirror assembly for an automotive vehicle has a shell having an aperture. A mirror is carried by the shell, substantially occluding the aperture. The mirror assembly has a lighting element having an electroluminescent film electrically connected to a triggering device for energizing the film and illuminating the mirror assembly. The triggering device includes first and second switches for generating a series of high and low frequency pulses and a control device connected to each of the switch for triggering each of the switches to illuminate the lighting element in either a flashing or continuous pattern.

13 Claims, 7 Drawing Sheets

MIRROR HAVING AN ILLUMINATED FILM FOR SIGNALING AND GENERAL ILLUMINATION

This application is a divisional of co-pending application Ser. No. 08/972,915 filed Nov. 18, 1997, which, in turn, claims priority to Austrian application no. A 1730/97 filed Oct. 13, 1997.

BACKGROUND OF THE INVENTION

1. Field of the Invention

The invention relates to a lighting device.

2. The Prior Art

Such a lighting device is known as a flexible, self-adhesive film brake light for motor vehicles according to DE 297 06 601 U1. This consists of a thin flexible film which is intensely illuminative and reflective, can be attached in a self-adhesive manner to the rear or rear window of the motor vehicle, and is supplied via a transformer with voltage through cable connections and connection to a brake light cable. A disadvantage in this respect is the rather low light intensity in such films according to present prior art, which at present comes to about 200 Candela/m$^2$, and the low durability of the films, so that failures frequently occur.

SUMMARY OF THE INVENTION

The object of the invention is now to provide a lighting element in which the light intensity is considerably increased, and whose structure offers the greatest possible protection against mechanical damage.

The object of the invention is achieved by the lighting device, wherein the lighting element is disposed on a carrier film, which has on an upper side facing said carrier film a surface structure forming reflectors, or is provided with a reflective coating. The surprising advantage in this respect is that by means of using a carrier film reducing the radiation losses an increased lighting intensity is achieved, so that the lighting element can be used also in those areas where specific minimal values do not permit the use of films known at present.

In other embodiments, the carrier film is in the form of a vibration-and/or shock-absorbing damping layer. Moreover it is advantageous that the lighting element is immovably connected, i.e. thermally glued to the carrier layer, or the lighting element is attached to the carrier film, or the lighting element is connected to the carrier film via an intermediate layer, e.g. an adhesive layer. It is also possible for the carrier film to be roughly U-shaped, and to form a receiving means for the lighting element. The advantage of these designs is that universal applicability of the lighting element is achieved by the low space requirements demanded by the overall structure, so that bulky assembly channels, which are expensive to form, and which in addition in previous lighting systems must be easily accessible for servicing and changeover of defective lamps, etc., are now eliminated. Such assembly channels also incur high costs in manufacture and precise co-ordination of materials which are suitable for deformation in order to provide such assembly channels. The invention may be used in a series of applications, e.g. for lighting and/or illuminating interior spaces, for formation of advertising messages, signs relating to danger points, emergency exit paths, without specific assembly measures. In this respect the flexibility of such lighting elements also plays a decisively positive part, as it is possible to attach them easily to spatially curved surfaces, and also to a high degree damage is effectively avoided.

In a further embodiment, the film forming the lighting element is formed with the carrier film as an integral injection-moulded part. Moreover it is advantageous that the injection-moulded part is formed from a plastics material composite of at least two electrically conductive layers connected by an electrically non-conductive insulating layer. An advantage in this respect is that in this way high quality and reliable compact elements may be manufactured particularly economically, and the desired shape and size suitable for the respective example of use can be achieved without substantial restrictions. Compact elements produced in this way are particularly suitable for mass production, as is desirable nowadays for the large batch numbers required.

A further advantage of the lighting device is that there is disposed on a surface of the film opposite the carrier film a transparent covering layer, e.g. a coloured film. An advantage in this respect is that in this way lighting fields, which emit lights of differing colours for purposes of differentiation, such for example as rear light units for motor vehicles, can be combined to form extremely compact units.

An advantageous design is characterised in that the covering layer is provided on one surface, preferably on a surface facing away from the film, with a surface structure, e.g. crystalline particles for scattering the traversing light, or the covering layer is structured on one surface, preferably on a surface facing the electro-luminescent film, in a lens shape in order to focus traversing light beams. An advantage in this respect is that in this way, as required, in accordance with the respective purpose of use of the lighting element, the emitted light beams may be given a specific direction.

A further advantage of the lighting device is that the carrier film is disposed with the film and covering layer in a vibration- and shock-absorbing peripheral layer encompassing a front and rear surface. Moreover it is advantageous that a protective layer, particularly of reversibly deformable plastic, is disposed on one surface of the film or on the covering layer laid over it. It is of advantage that in this way the lighting element can be used even at high-risk positions, e.g. in the corner area of vehicles, etc., as these latter represent a low risk of damage.

In a further embodiment, light-guiding devices, e.g. reflectors, are disposed in the protective layer, so that a further substantial influence on the light beams is possible in accordance with the requirements in the respective envisaged use.

An advantageous design is characterised in that the covering layer is designed as a connecting layer for securing the lighting element in a casing portion, e.g. in a portion of the bodywork of the vehicle, particularly of a motor vehicle, in which way, according to one design as described in claim 15, expensive assembly elements and constructive measures can be eliminated in its use.

A further advantage of the lighting device is that the lighting element may be powered via the supply and/or triggering device by pulses, particularly by low-frequency voltage pulses. It is further possible for the pulses to be formed from high-frequency pulses, particularly of a high-frequency alternating voltage. It is also possible for the frequency of the alternating voltage to be between 500 and 50 kHz. An advantage in this respect is that on the one hand the life duration of the lighting element is thereby increased, in that the chemical decomposition process of the elements is delayed by the phased pulses, which affect the inorganic or organic particles in the film. Furthermore, the light intensity may be considerably increased thereby.

A development is also possible in which a plurality of lighting elements operated independently of one another are combined in one casing portion, e.g. a portion of the bodywork of a vehicle, to form a lighting device. It is further possible for the lighting device to be acted upon by supply and/or triggering devices which are operated independently of one another. An advantage in this respect is that a wide field of application is achieved and possible designs are afforded, enabling unrestricted design for the lighting unit and thus also for the objects on or in which these latter are to be used.

It is further of advantage that the entire spectrum of the lighting elements necessary in or on a vehicle, which emit a permanent light or a flashing light in corresponding environmental circumstance, is covered.

The disposition of such a lighting device with the lighting element in or on read-view mirrors for indicating intended alterations in direction, i.e. as an additional signal flasher, is advantageously achieved in that these lighting elements require little space in their incorporation and structure, and the necessary supply and/or triggering devices can be optionally integrated at any point on the vehicle, or when designed in a hybrid manner may be integrated directly in the lighting element without the necessity for cable guides. In such a case only supply from the energy source is necessary which, due to the low energy requirement of such lighting elements, cause only a small outlay. Due to the possibilities of shaping, such lighting elements are suitable for outer surfaces of the casing of rear view mirrors, as they may be turned around end faces and thus flashing signals are clearly visible to both approaching and following vehicles and even during an overtaking procedure. Thus such lighting elements can also make a considerable contribution to increasing safety in traffic.

A further substantial advantage of all these advantageous solutions resides in the low energy requirement for such lighting elements and also in the fact that, in comparison to previous lighting arrangements, they radiate almost no heat and therefore can be made of less temperature-resistant materials without special ventilation measures or measures for heat removal. Due to this very considerable advantage, such lighting elements are also suitable as background illumination for instruments and instrument channels; here also the low space requirement plays a substantial part in their effective use.

BRIEF DESCRIPTION OF THE DRAWINGS

For better understanding of the invention, it is described in more detail with reference to the embodiments given by way of example and shown in the drawings.
Shown are.

DETAILED DESCRIPTION OF A PREFERRED EMBODIMENTS

It should initially be stated that in the variously described embodiments, identical parts have been provided with identical reference numerals or identical component titles, the disclosures contained in the entire description being logically transferable to identical parts with identical reference numerals or identical component titles. In addition, the details of position selected in the description, such for example as top, bottom, lateral, etc. refer to the FIG. directly described or illustrated, and upon an alteration in position are to be logically transferred to the new position. Furthermore, individual features from the various embodiments shown can represent independent solutions according to the invention.

Figure 1:
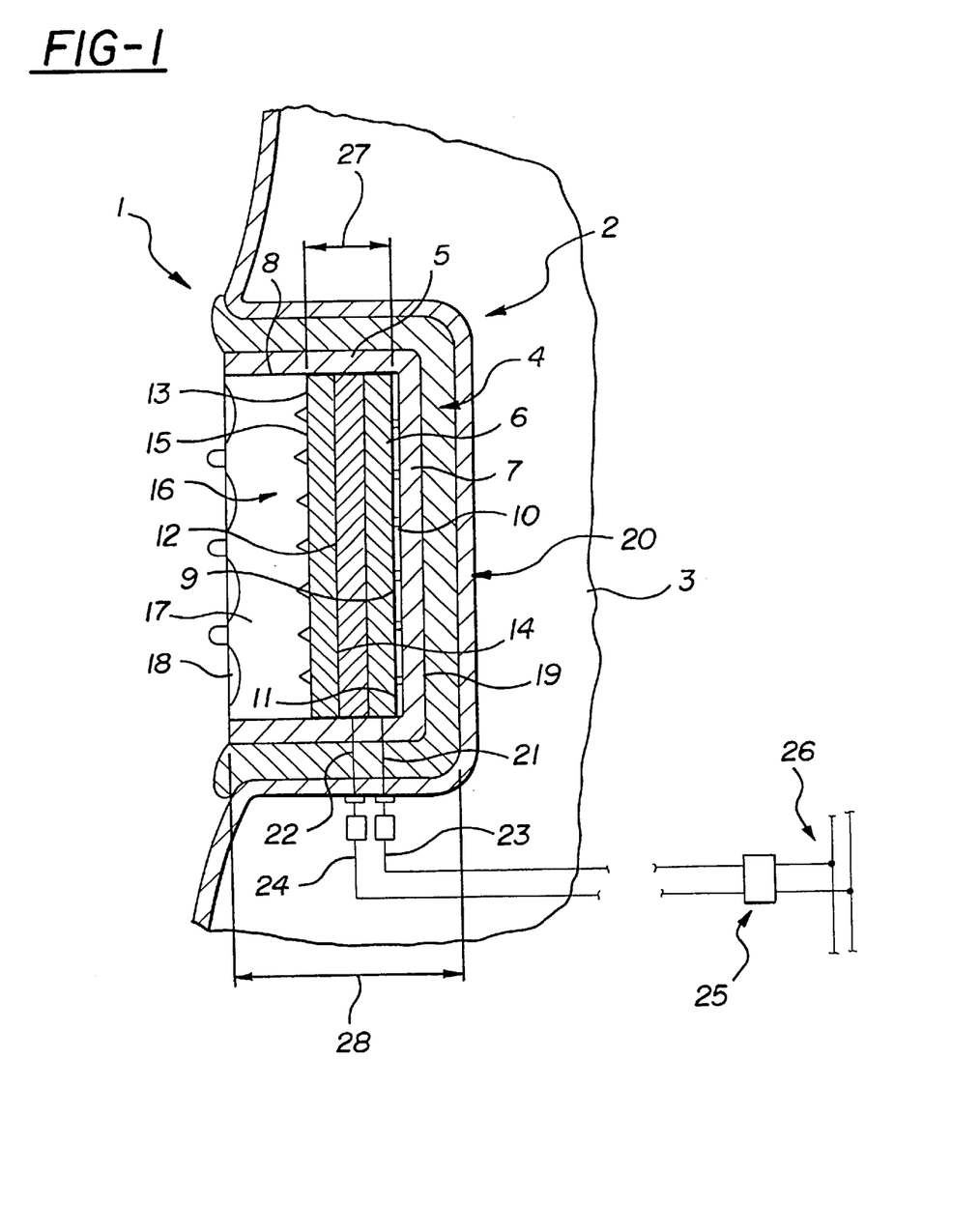
FIG. 1: the lighting device according to the invention in a simplified schematic view.

In FIG. 1, a lighting device 1 is shown inserted in a receiving means 2 of a casing portion 3. The lighting device 1 substantially consists of a lighting element 4, which consists of an at least double-layered electro-luminescent film 5 and is connected over the entire surface via an intermediate layer 6 to a carrier film 7. The carrier film 7 preferably encompasses the film 5 in the area of its surrounding edge faces 8. On an upper side 9 facing the film 5, the carrier film 7 has a surface structure which forms reflectors 10, which reflect the light beams emerging from the film 5. Such reflection is also to be achieved by a so-called reflective coating, as also with a reflection coating 11, e.g. a mirror finish of the upper side 9. On a surface 12 opposite the upper side 9 of the carrier film 7 there is disposed, preferably on the film 5, a transparent cover layer 13, e.g. a plastic film. This covering layer 13, depending on the light effects required, can be provided on a surface 14, 15 facing, or facing away from the film 5, with coatings for scattering or focusing the traversing light beams. Such coatings can be provided with crystal particles, or a surface structure can be provided which forms a lens structure covering the entire surface. For further protection of the lighting element 4, there may preferably be disposed on a front surface 15 of the covering layer 13 a further protective layer 17, e.g. of transparent, break-resistant resiliently reversible plastic. In order to achieve further light effects, there may preferably be provided in this protective layer 17 the optical elements, e.g. reflectors 18, etc., influencing the light radiation. Furthermore, there may be provided between the carrier film 7, which is preferably formed from a vibration- and shock-absorbing plastic, and the casing portion 3, as shown in FIG. 1, a cover layer 19 as a connecting layer 20 simplifying assembly and absorbing deformation forces, and which for example consists of a self-adhesive permanently elastic plastic material. Via contact terminals 21, 22, the layers of the film 5 are contacted with cables 23, 24, which further lead to a supply and/or triggering device 25, which are connected to a power source 26.

The lighting element 4 comprising film 5 and carrier film 7 has in all a thickness 27 of only a few millimetres. Thus there results for incorporation of such a lighting device, a depth 28 in the range between 5 and 20, preferably about 10 mm, so that said lighting device 1 may be used in a versatile manner and requires no outlay in assembly terms. It is also possible rapidly to interchange the entire lighting device 1, although this, due to the robustness and long-life duration of the individual elements, is not normally necessary during the period of use of an appliance, particularly a vehicle. The lighting device 1 with lighting element 4 is therefore usable in many ways, and may be operated with a low energy requirement. A long life duration and increased light intensity are achieved by special circuitry measures, as will be described later.

Figure 2:
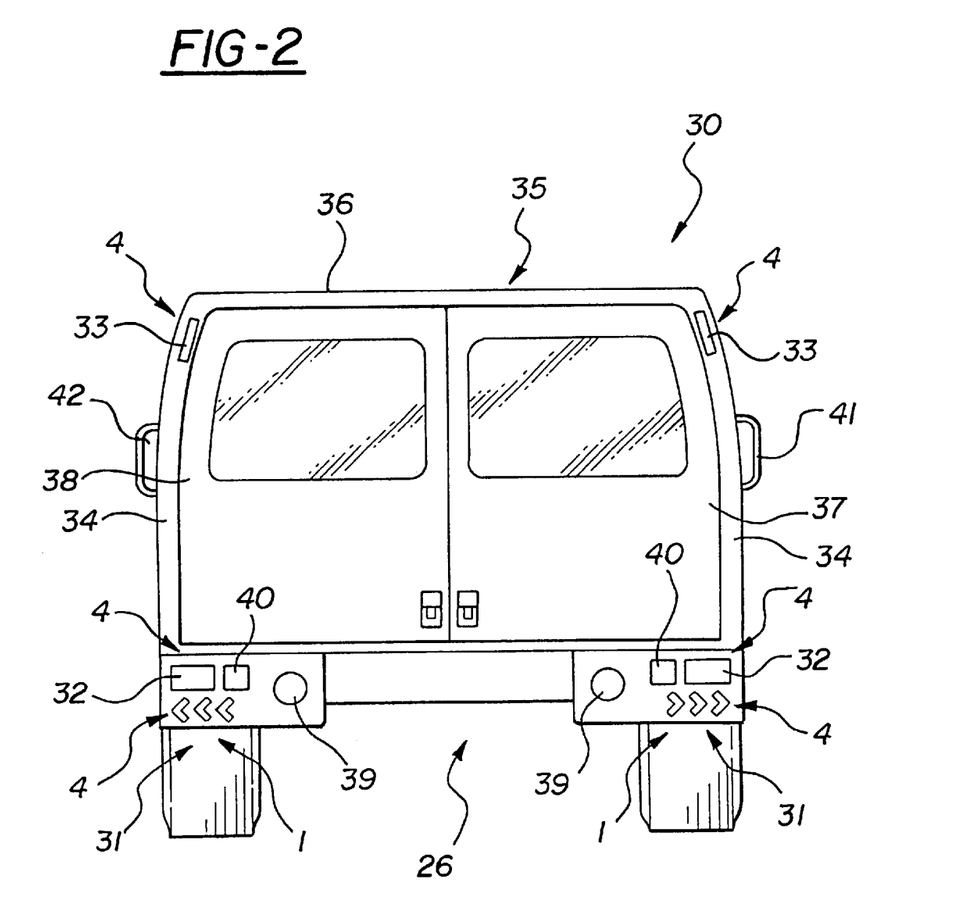
FIG. 2: an embodiment in the form of a vehicle of the lighting device according to the invention in a simplified, schematic view.

FIG. 2 shows an embodiment of the lighting device 1. For this purpose a plurality of the lighting elements 4 described above are disposed on a rear portion 29 of a vehicle 30.

In this respect the lighting elements 4 may have different shapes for the most varied purposes of use on the vehicle 30, i.e. for example when the lighting element 4 is used for a flashing device 31, the lighting element 4 is designed in the form of arrows. In this respect it is possible when the lighting element 4 is used for a brake light 32, for the latter to be designed in a rectangular form as known from prior art with normal lamp-operated brake lights 32, and can be disposed over a large area on the rear position 29 of the vehicle 30.

Due to the simplicity of working the lighting device 1, it is now possible for additional brake lights 33 to be disposed on the frame 34 of the vehicle chassis 35, particularly in the case of a truck. As any optional shape may be produced for such a lighting device 1, so that an additional lighting device 1 can be positioned for a further brake light 33 on the frame 34 of the vehicle chassis 35, without great expense on the vehicle chassis 35, particularly on the frame 34, without the necessity for undertaking special structures on the roof 36 of the vehicle 30 as with prior art, i.e. by designing the additional brake lights 33, the lighting device 1 is produced in a longitudinal direction, so that a correspondingly large surface on the vehicle structure 35, particularly on the frame 34 can be utilised, without, as is known from prior art, the necessity of using the vehicle doors 37, 38 or a roof structure. If a lighting device 1 were disposed on one of the two vehicle doors 37, 38, then a high outlay would be incurred for power supply to the lighting device 1, in order to avoid faults at the points of contact. Naturally it is possible for the lighting device 1 to be disposed also on the vehicle doors 37, 38 as a symbol or an additional lighting device.

It is further possible to use the lighting device 1, particularly the lighting element 4 as a reversing light 39. In this respect as shown for example on the vehicle 30, it is possible for the reversing lights 39 to be circular in shape.

Due to the various arrangements and fields of application of the lighting elements 4, it is possible for such elements 4, singly or in pairs, to emit different colour signals, as is known from prior art. For example it is possible in this case for the flasher device 31 to emit a yellow light in the form of flashing signals, whilst the brake lights 32, 33 emit a red light and the reversing lights 39 give out a white light. It is also possible for the vehicle 30, as is prescribed by law, to be fitted with a rear lamp 40 in the form of the lighting device 1, so that during night journeys this rear light, with projectors disposed on the base, emits a permanent red light.

It is also possible, for example, also to dispose lighting devices 1, particularly the lighting elements 4 on the rearview mirrors 41, 42 of the vehicle 30, so that the legally prescribed lateral flashing lights can be omitted.

The advantage of using the lighting device 1, particularly the lighting elements 4 for illuminating the vehicle 30 resides in the fact that due to the thin layered structure of the lighting element 4, these can be attached to smooth surfaces of the vehicle 30, or only small hollowed portions need be provided on the bodywork portions, so that cost-effective manufacture of the vehicle 30 is guaranteed. It is also possible, due to the thin design of the lighting elements 4, to retro-fit the vehicles 30 in a cost-effective manner and in a simple form with additional lights. A further advantage resides in the fact that due to the flexible design of the lighting device 1, said lighting device 1 is not destroyed upon contact with other articles, but that it adapts to the deformation of the bodywork parts, so that the lighting device 1 will not break or require to be replaced when the bodywork parts revert to their original shape.

It is naturally possible, due to the simplicity of working the lighting device 1, to mount advertising messages or specially designed informative text on the vehicle 30. In this respect it is for example possible, when such a lighting device 1 is used on a school bus, that the latter can activate the lighting device 1 at a bus stop, so that a print sequence appears at the rear of the vehicle, for example with "Danger!Children", so that a considerable advance in traffic safety on the roads is achieved.

Power supply to the individual lighting devices 1 is carried out as in lighting systems known in prior art, from the energy source disposed in the vehicle 30, particularly the battery or light generator; in order to convert the power supplied, a control appliance can be provided before each lighting device 1, or an individual control appliance can be provided for all the lighting devices.

A further advantage in the use of such a lighting element 4 resides in the fact that due to the thin layered construction, the lighting device can be adapted to the most varied spatially curved shapes of the vehicle 30.

FIGS. 3 to 7 show embodiments of the use of such a lighting device 1 in different designs.

The embodiments shown in FIGS. 3 to 7 relate to an application of the lighting device 1 in an inner space of the vehicle 30. For this purpose, a sun-shade 43 with a mirror 44 disposed thereon is shown in FIGS. 3 to 7.

Figure 3:
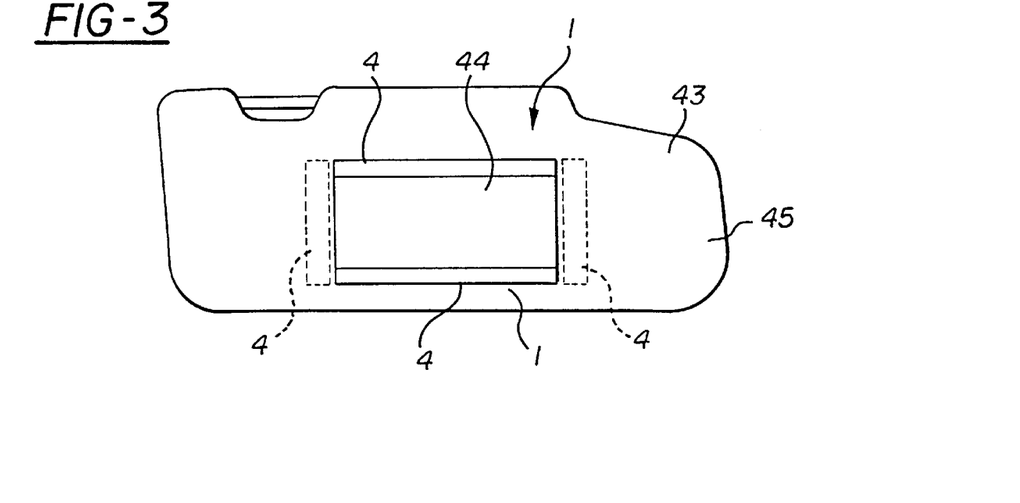
FIG. 3: a further embodiment of the lighting device according to the invention in a simplified, schematic view.

As can now be seen in FIG. 3, on either side of the mirror 44 flanking its lateral edges in the longitudinal direction is a respective lighting device 1, particularly the lighting element 4.

The function of the lighting device 1 or of the lighting element 4 in relation to the mirror 44 in the sun-shade 43 resides in the fact that, when the sun-shade 43 is swung down, the lighting device 1 is automatically activated, i.e. by means of swinging down the sun-shade 43 a power supply is effected to the lighting device 1, so that the lighting element 4 begins to shine.

The advantage of such an arrangement resides in the fact that the lighting device 1 radiates directly into the inner space of the vehicle 30 or into the face of the user, so that the user can recognise himself in the mirror. A further advantage of use of the lighting device 1 with respect to the mirror 44 in the sun-shade 43 resides in the fact that, due to the flat construction of the lighting element 4, no special measures or designs need be present in the sun-shade 43, but that the mirror 44 and the lighting elements 4 can be simply secured on a surface 45. The mirror 44 and the lighting device 1 or lighting element 4 may for example be attached by simple gluing.

A further arrangement of the lighting element 4 is shown in dotted lines in FIG. 3. In this case the lighting elements 4 are disposed on the front face of the mirror 44. Naturally it is possible for the lighting elements 4 to be disposed both in the longitudinal direction of the lateral edge of the mirror 44 and in the region of the end surface of the mirror 44.

Figure 4:
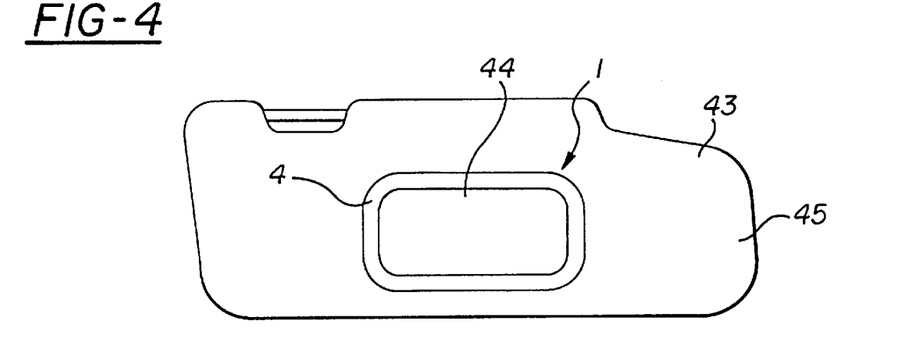
FIG. 4: another embodiment of the lighting device according to the invention in a simplified, schematic view.

FIG. 4 shows another embodiment of the sun-shade 43. In this embodiment at least one lighting device 1, i.e. the lighting element 4, is disposed on the periphery of the mirror 44. It can be seen from this embodiment that both individual struts and also circular or rectangular designs of the lighting element 4 can be provided with such a lighting device 1.

Figure 5:
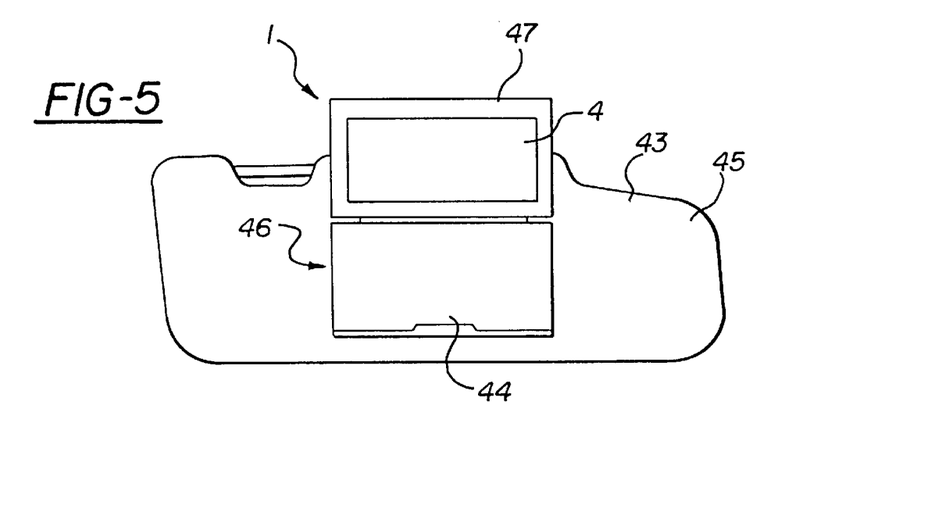
FIG. 5: an embodiment of the lighting device according to the invention in a simplified, schematic view.
Figure 6:
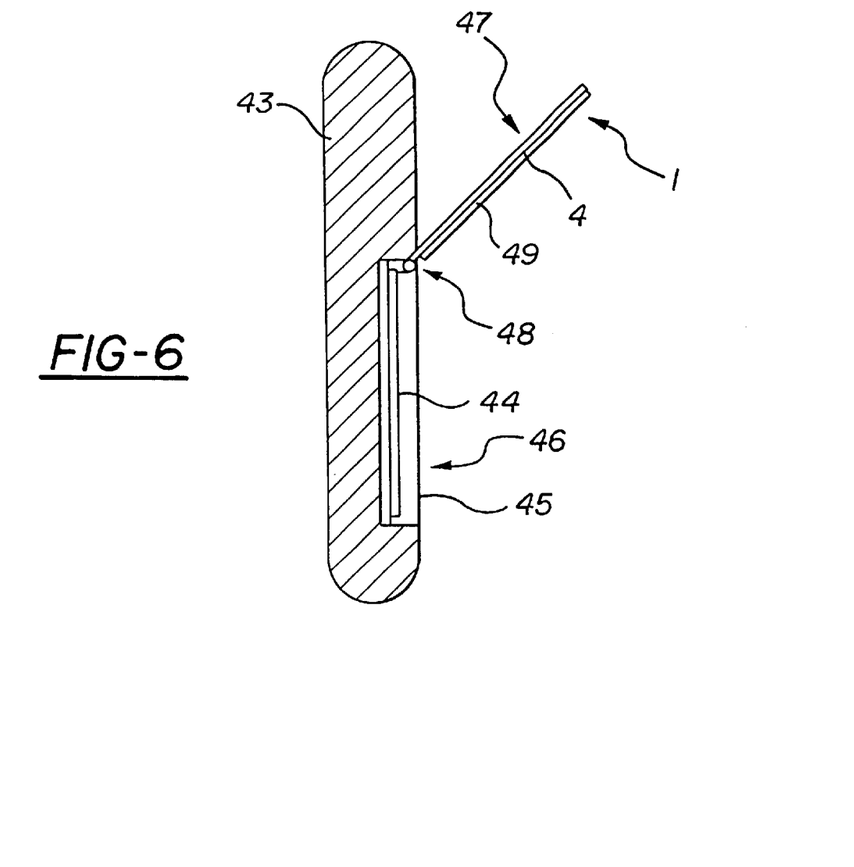
FIG. 6: a side view an embodiment of the lighting device according to the invention according to FIG. 5.

FIGS. 5 and 6 show a further embodiment of the sun-shade 43. In this embodiment the mirror 44 is disposed in a recess 46 of the sun-shade 43. This embodiment also has a flap 47, by means of which the mirror 44 can be covered. The flap 47 may for example be opened through an angle of 135°, and is connected by a joint arrangement 48 to the sun-shade 43, so that by swinging up the flat 47, the mirror 44 becomes visible, In this respect it is possible for the flap 47 to be fixed when open by a blocking device. So that the mirror 44 or the inner space can be illuminated, the lighting device 1, particularly the light element 4, is disposed on an inner side 49 of the flap 47.

In this embodiment the power supply to the lighting device 1 is activated only after the flap 47 has been swung upwards, i.e. when the sun-shade 43 is swung down, the power supply for the lighting device 1 is not activated, but only when the flap 47 is open. This is of advantage in that in this way, when the mirror 44 is not required, yet while still providing a corresponding shade form the sun, the sun-shade 43 can be swung down into the interior space of the vehicle, without the lighting device 1 being supplied with power.

A situation is further achieved in which, due to the inner side 49 of the flap 47, which has at least one lighting element 4 for covering the mirror 44, the emerging light illuminates the mirror 44 and the interior of the vehicle in the position of use of the sun-shade 43. For this purpose the lighting element 4, when the flap 47 is opened at an angle, is fixed by the blocking device at an angle of about 135° between a plane accommodating the sun-shade 43 and a plane accommodating the flap, and in this position of the lighting element 4 is directed towards the interior of the vehicle.

Figure 7:
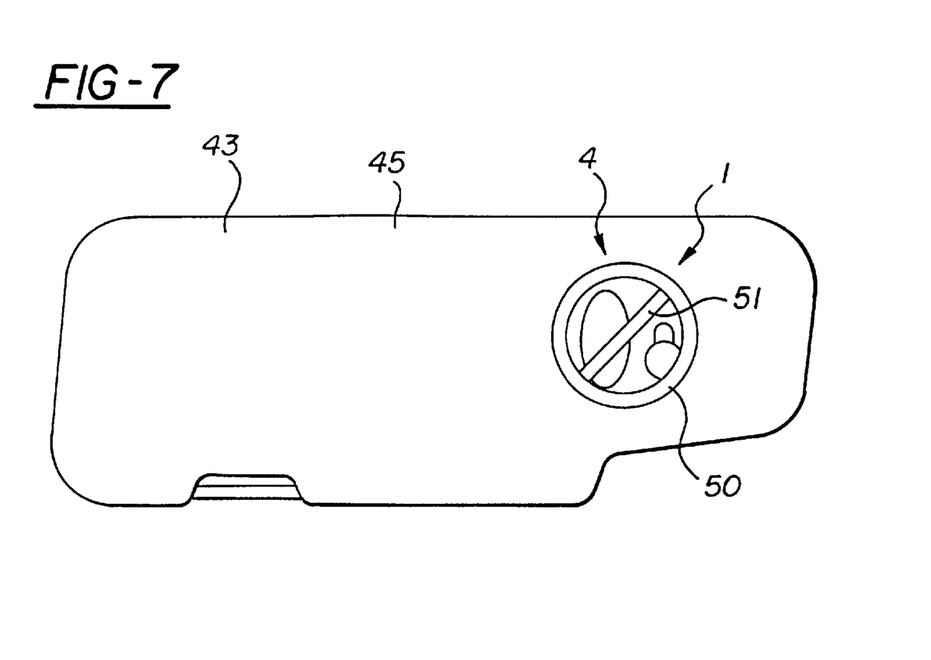
FIG. 7: a further embodiment of the lighting device according to the invention in a simplified, schematic view.

FIG. 7 shows a further field of application of the lighting device 1, particularly the lighting element 4. In this embodiment the lighting device 1, particularly the lighting element 4, is used for a symbolic representation in the interior of the vehicle, such as a pictogram, symbol, advertising sign, print image etc.

In this respect it is possible for the lighting element 4 to have the most varied shapes. In the embodiment shown the lighting element 4 has a circular cut-out 50, a cross-piece 51 being disposed in the inner space of the circular cut-out 50. In addition it is possible for drawings or any representations to be disposed in the background. In this respect it is for example possible that in using such a design of the lighting device 1, a cigarette is disposed in the inner space, so that due to the symbolic representation of the circle with a cross-stripe the passengers or the driver are informed that smoking is forbidden in the automobile. Naturally it is possible for any symbolic representation to be executed with such a lighting device 1 or with the lighting element 4. It is also possible to dispose specific print sequences in the interior of the vehicle or externally on the bodywork of the vehicle 30.

The field of application of such a lighting device, particularly of the lighting element 4, can be diverse with respect to a vehicle. For example it is possible to use the lighting device to illuminate an ash-tray, electrical window raisers or switches, etc. It is also possible to dispose the lighting element 4 on a portion of the inner lining, e.g. the roof, on the end face casing portion 3 of a door, on door thresholds, or as emergency exit signs in the gangway area of a vehicle 30.

When the lighting element 4 is incorporated in the interior of the vehicle 30, particularly in the sun-shade 43, it is advantageous for the lighting element 4 or the film 5, when it is not supplied with power, to be flesh-coloured, as in this way it is not recognisable by a person. It is further possible by using a special switch to supply the sun-shade 43 with power upon even slight opening of the flap 47 or of the sun-shade 43, so that in this way the basic colour of the lighting element 4 cannot be recognised, and thus special colour filters for the lighting element 4 are omitted.

Figure 8:
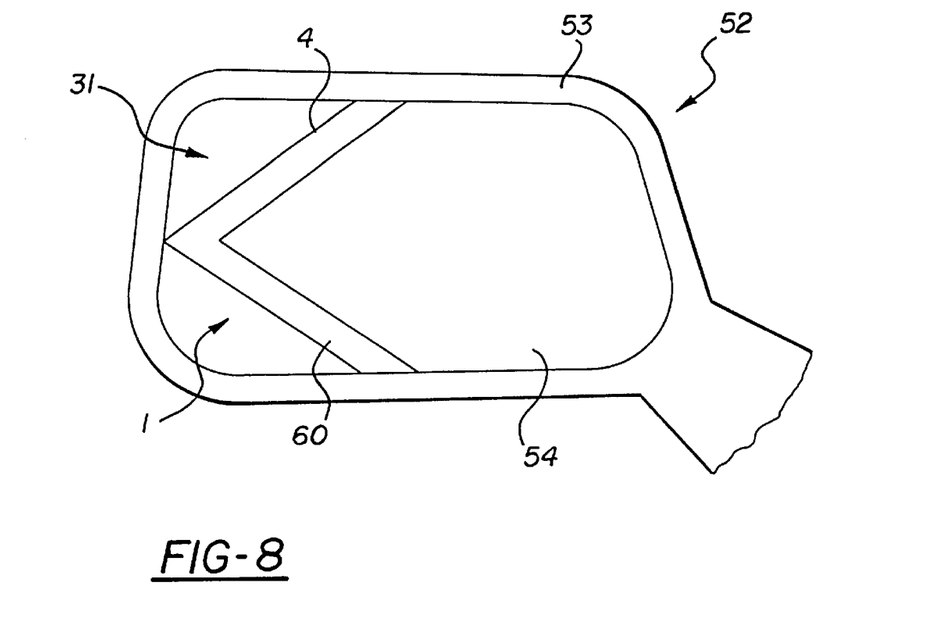
FIG. 8: a pictorial illustration of a further embodiment of the lighting device according to the invention in a simplified view.
Figure 9:
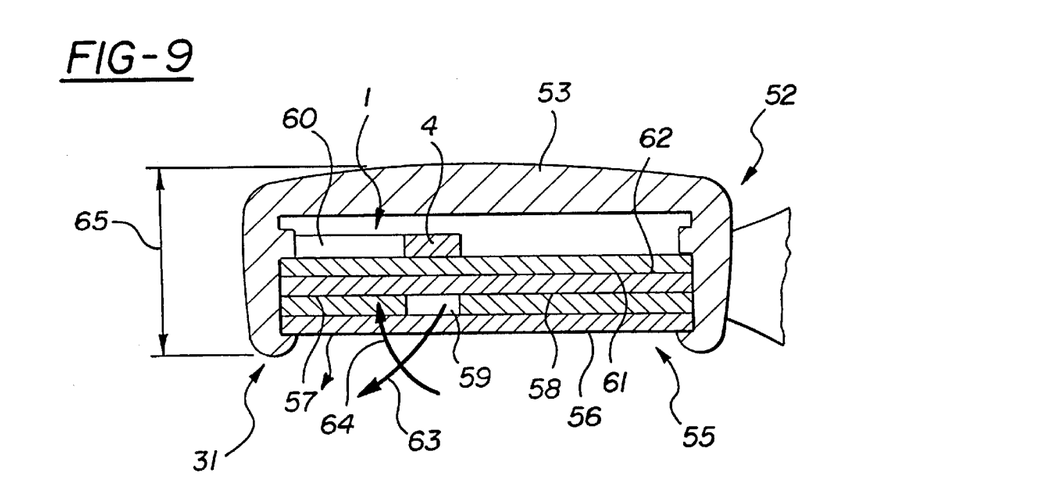
FIG. 9: a plan view of the embodiment according to FIG. 8 in cross-section and in a simplified, schematic view.

FIGS. 8 and 9 show an embodiment of an arrangement of a lighting device 1 for an external mirror 52 of a vehicle 30.

In the embodiment shown, the lighting device 1 is used as a flashing device 31, i.e. by providing the lighting device 1 with power a flashing light is emitted by the lighting element 4.

For this purpose, in the external mirror 52 shown, the lighting device 1 or the lighting element 4 is disposed in a casing 53, the user of the vehicle not being hindered upon activation of this lighting device 1 in the external mirror 52, i.e. the user of the vehicle 30, glancing in the external mirror 52, has available the entire mirror surface 54 for monitoring the traffic.

In order to achieve this, a special construction of the external mirror 52 is necessary. This is produced by forming a layered structure of a plurality of layers to result in a mirror device 55. For this purpose the outermost layer of the mirror device 55 is formed by a commercially available glass 56 or transparent film or plastic layer, a mirror layer 58, consisting of chromium, being applied to a side lying opposite the line of sight on a surface 57 of the glass 56. By means of this mirror layer 58 a situation is achieved in which, when one looks into the glass 56 on the side lying opposite the mirror layer 58, the impinging light is mirrored on the mirror layer 58, so that in accordance with the angle of incidence of the eye of the user, corresponding image is shown on this mirror layer 58.

In the area in which the lighting device 1, particularly the lighting element 4 is to be disposed, the mirror layer 58 is etched out, as shown by a free space 59, As the lighting element 4 is in the form of an arrow 60, only a partial section of this free space 59 is visible in FIG. 9. The shape of the lighting element 4 in the form of an arrow 60 has been selected in that the lighting device 4 is to be used as a flashing light for turning in a specific direction of the vehicle 30, so that the vehicles following the vehicle 30 or the vehicles lateral thereto can recognise the turning direction or flashing direction of the vehicle 30.

So that a reflection of the impinging light is provided also in the free space 59, in which no mirror layer 58 is applied, a dichroic layer 61 is disposed on the mirror layer 58, so that by applying an article, particularly of the lighting device 1 in the region of the free space 59 a mirroring results, i.e. by means of the dichroic layer 61 a situation is achieved in which the otherwise blind point of the mirror device 55 is improved in such a way that by the application of a lighting device 1 or of another article behind the dichroic layer 61, i.e. by darkening the free space 59, a mirror image is provided, so that no blind points result on the mirror surfaced 54.

So that the user of the vehicle is not distracted by the light element 4 disposed on the external mirror 52, a deflecting layer 62 is disposed on the dichroic layer 61. The deflecting layer 62 has the purpose of deflecting the light emitted by the lighting device 1 in the opposite direction to the user of the vehicle, so that the user cannot recognise the flashing light in the external mirror 52, i.e. by means of activating the lighting device 1, particularly the lighting element 4, the emitted light beams 63 are deflected via the deflecting layer 62 at an angle 64 of about 30° in the opposite direction to the user of the vehicle, so that the vehicles 30 travelling behind the vehicle 30 however can recognise the light source in the external mirror 52, without the driver of the vehicle or the user of this light source being hindered thereby.

In order now that a light signal or the light beams 63 can be emitted, the lighting device 1 or the lighting element 4 is disposed on this deflecting layer 62. The lighting element 4 or the lighting device 1 must in this case be disposed on the deflecting layer 62 in such a way that the etched-out free spaces 59, provided by etching out in the mirror layer 58, are covered, so that due to the dichroic layer 61, darkening of these free spaces 59 is provided and thus a mirror image is achieved on the entire surface of the mirror device 55.

In this respect it is for example possible that the lighting element 4 need not be designed in accordance with the arrow 60 shown, but that the lighting element 4 may be disposed over the entire or part surface of the overall deflector layer 62, the light beams 63 being able to penetrate outwards through the mirror device 55 only in the area of the space 59. This is of advantage in that in this way by simple exchange of the layered structure, particularly of the glass 56, with the most varied layers lying behind, various symbols can be shown or can be interchanged on the external mirror.

An advantage of such a construction resides in the fact that by means of such an arrangement on the vehicle 30 the lateral, legally prescribed flashing lights can be omitted and thus the appearance of the vehicle 30 can be improved. A further advantage resides in the fact that by using lighting device 1 on the external mirror 52, the thickness 65 thereof can be kept very small, and thus costs or material can be saved in constructing the external mirror 52.

Figure 10:
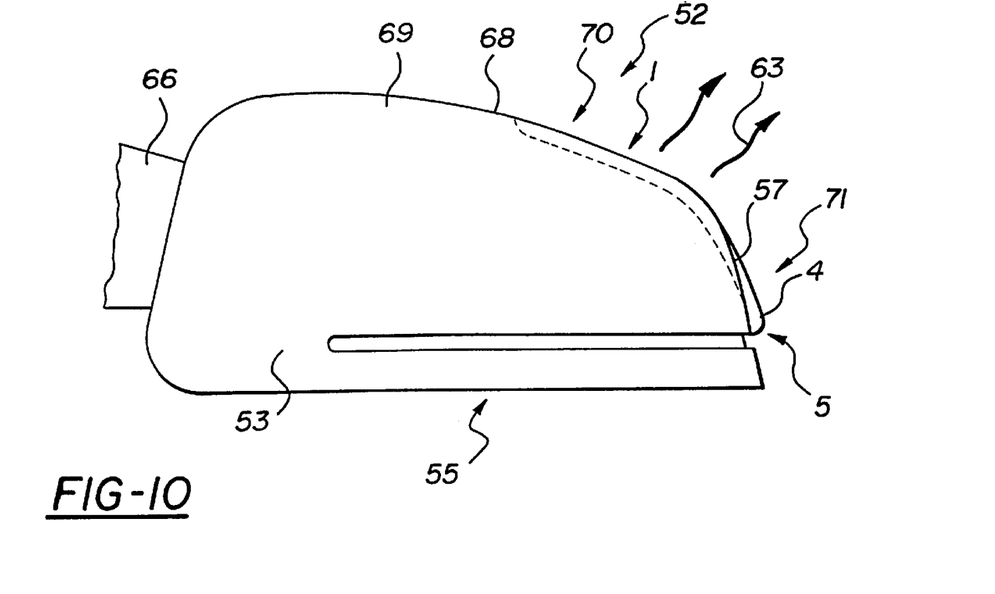
FIG. 10: a further pictorial view of a field of application of the lighting device according to the invention in a simplified, schematic view.
Figure 11:
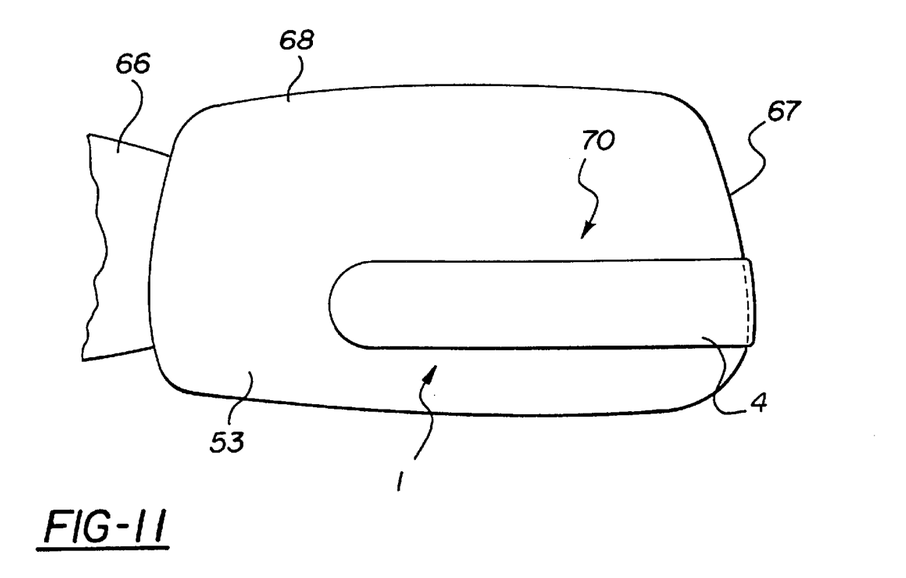
FIG. 11: a rear view of the embodiment according to FIG. 10 in a simplified, schematic view.

FIGS. 10 and 11 show a further embodiment of an arrangement of the lighting device 1 with respect to the external mirror, in particular a rear-view mirror of a vehicle 30.

In the embodiment shown, the lighting device 1, particularly the lighting element 4, is now disposed over at least a partial area of the external surface of the casing 53, the lighting element 4 for this purpose being preferably disposed on an end face 67 facing away from a retaining device 66 for the vehicle 30. In this case the lighting element 4 extends from the end face 67 to an adjacent rear surface 68 which is disposed opposite the mirror device 55. Thus the lighting element 4 is secured to an outer side 69 of the casing 53, so that approaching vehicles can recognise the emitted light beams 63 when the lighting device 1 is actuated.

It is further possible to insert the lighting element 4 in a recess 70 in the casing 53, the recess tapering in the direction of the face edge 67, so that emergence of the lighting device 1 from the recess 70 is ensured in the area of the end faces 67.

It can now be said that the recess 70 for the lighting element 4 is disposed in the rear surface 68 of the external mirror 52, said recess preferably being in a flared shape on the end surface 67, and that the lighting element 4 projects over the end face 67 by a thickness, particularly by a thickness of the film forming the lighting element 4.

This is of advantage in that in this way those vehicles 30 which are passing the external mirror 52 laterally, can recognise a small area 71 in the region of the end edges 67, so that it is ensured that even passing vehicles 30 can perceive this when the lighting device 1 is activated.

In addition, in this way a situation is achieved in which by means of emergence of the lighting device 1 from the recess 70 in the external mirror 52 when the vehicle 30 is overtaken or passed and the lighting device 1 is activated, the overtaking vehicle 30 can firstly recognise a narrow-strip in the region of the end face 67, however as the distance reduces, the area 71 for recognition of the lighting device 1 is increased for the passing vehicle 30, particularly the driver of a vehicle 30, so that the lighting device 1 is prevented from being overlooked when it is activated. Thus it is possible in such an embodiment in turn to use the lighting device 1 as a flashing device 31, so that the lamps located laterally on the vehicle 30 can be omitted.

Naturally it is possible for the lighting device 1 to be disposed, not over a partial area of the outer surface 69 of the external mirror 52, but that the entire outer surface 69 of the casing 53 is formed by such a lighting device 1.

Figures 12, 13, 14:
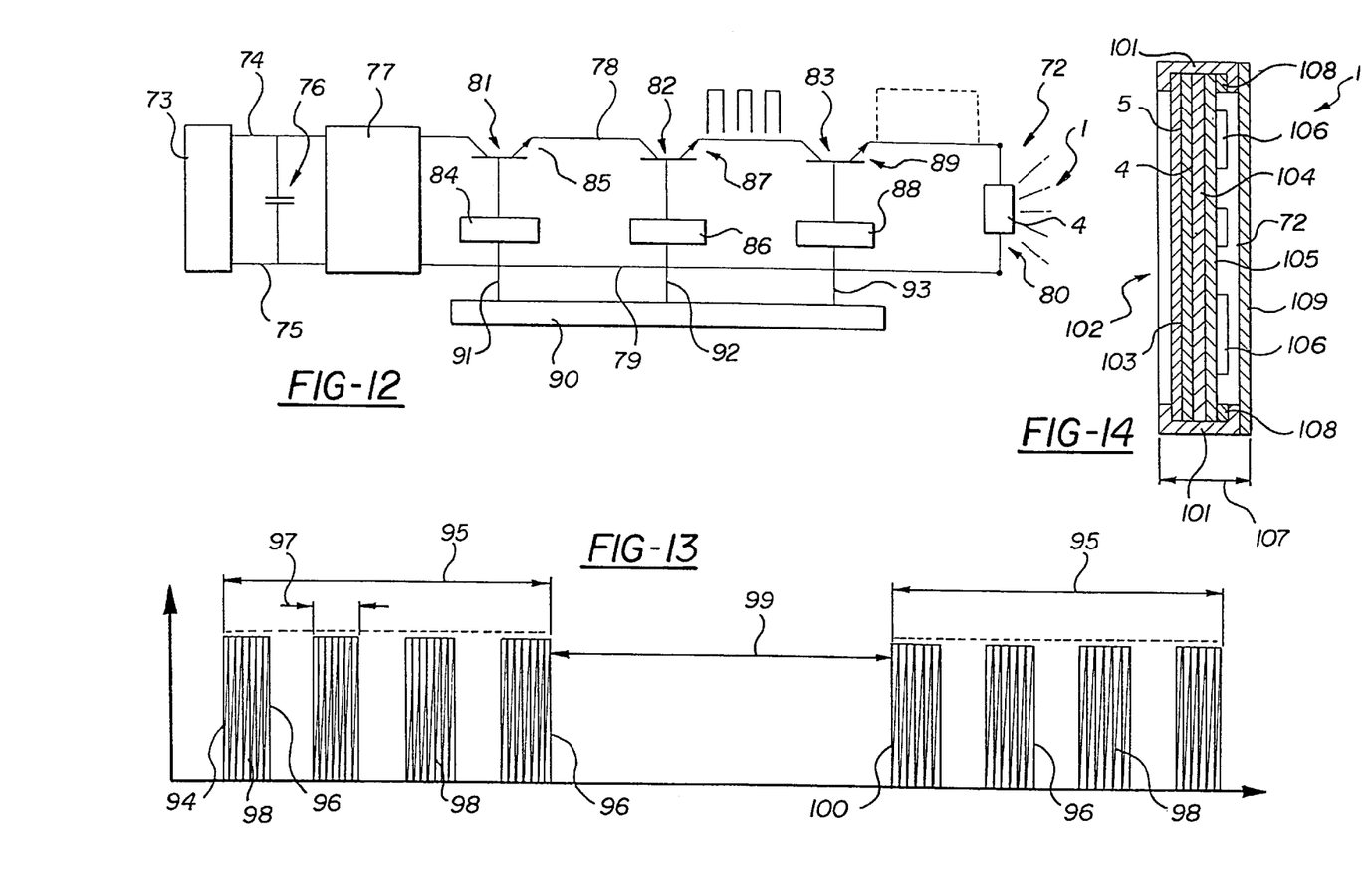
FIG. 12: a circuit diagram for control of the lighting device according to the invention, in a simplified, schematic view.
FIG. 13: a diagram of a signal configuration for triggering the lighting device according to the invention in a simplified, schematic view.
FIG. 14: a further embodiment of a construction of the lighting device according to the invention in a simplified, schematic view.

FIGS. 12 and 13 show an embodiment for control of the lighting device 1, as shown in the FIGS. 1 to 11 previously described. For this purpose FIG. 12 shows a schematic circuit diagram, whereas in FIG. 13 there can be seen a diagram showing the power supply for the lighting device 1. Basically it should be mentioned that in the embodiment shown a triggering system for the flashing device 31 is shown. Naturally it is possible for such a triggering to be used also for continuous use.

The circuit diagram shown has a power source 73 for supplying a control device 72. The power source 73 may for example be formed from a direct current source, particularly a battery, or by an alternating current source. In this respect it should be mentioned that when an alternating current source is used, the known rectifying methods for converting the alternating power source into a direct current power source familiar to a person skilled in the art and known from prior art can be used, so that supply of the lighting device 1 in turn is effected by a direct current.

In order that the lighting device 1 may be supplied with power, two cables 74, 75 are connected to the power source 73, the cable 74 being used for positive potential and the cable 75 for negative potential. It is possible to dispose a support condenser 76 parallel to the power source 73 and between the two cables 74,75.

The cables 74, 75 are then connected to a converter device 77. The converter device 77 has the purpose of converting the direct current, i.e. that the direct current supplied from the power source 73 is converted by the converter device 77 to a corresponding voltage level. It is for example possible to use a transformer as a converter device 77. If a transformer is used as a converter device 77, the person skilled in the art, as is already known from prior art, must first form from the direct current supplied from the power source 73 an alternating voltage, as is possible for example by means of a full bridge or by oscillators or generators, so that a transfer of the supplied power via the transformer is possible. Then the alternating source formed can be reconverted into a direct current. Naturally it is possible for any optional form of converter device 77 to be used for converting the power from the power source 73.

Connected to the output of the converter device 77 are supply lines 78, 79 for supplying a consumer 80. The consumer 80 is now formed by the lighting device 1, particularly by the lighting element 4.

So that the consumer 80 is now supplied with power and thus begins to illuminate, a plurality of switching devices 81 to 83 are incorporated between the converter device 77 for the positive potential in the supply line 78. The switching devices 81 to 83 can for example be formed by transistors. It is naturally possible to use any optional form of switch device, for example a switch, a relay or the like. The switch devices 81 to 83 are incorporated in series with the supply line 78, i.e. an interruption to the supply line 78 results when the switch device 81 to 83 is not activated, so that an interruption in the energy supply to the consumer 80, particularly to the lighting device 1, occurs.

The individual switch devices 81 to 83 are initiated via generators, particularly frequency generators. Thus the switch device 81, which is incorporated in series with the converter device 77, is triggered via high frequency generator 84. By means of triggering the switching device 81 via a high frequency generator 84 a situation is achieved in which the direct current supplied from the converter device 77 is chopped up in accordance with the set frequency at the high frequency generator 84, as is pictorially shown at the output 85 of the switch device 81, and thus forms a high frequency alternating current. Thus it is possible for the high frequency generator 84 to have a frequency range between 500 and 50 kHz, i.e. that due to the frequency of for example 10 kHz set at the high frequency generator 84, a high frequency voltage is generated at the output 85 of the switch device 81 with a corresponding frequency of 10 kHz.

Connecting with the switch device 81 is the further switch device 82, again incorporated in series in the supply line 78. The switch device 82 is again triggered via a frequency generator, however in this case by a low frequency generator 86, i.e. again a low frequency signal is generated at an output 85 of the switch device 82. The frequency of the low frequency generator 86 can be between 10 and 50 Hz, so that a corresponding low frequency signal, as shown pictorially at the output 87, is generated.

It is further possible for a further switching device 83 in series with the switching devices 81, 82 described above, particularly with the switch device 82, is incorporated in series with the supply line 78. The switch device 83 is in turn triggered by a low frequency generator 88, this latter being capable of having a frequency between 0 and 10 Hz. By means of this switching device 83 a low frequency signal, as shown pictorially at an output 89 of the switch device 83, is formed.

In connection with the switch device 83, the consumer 80 is connected between the two supply lines 78, 79, so that parallel incorporation of the consumer 80 to the converter device 77 is provided. Due to the various signal shapes as formed by the individual switch devices 81 to 83, it is now possible for the lighting device 1, particularly the consumer 80 to be supplied with power from the converter device 77. In order however that the consumer 80, in particular the lighting element 4, is supplied with power, all the switch devices 81 to 83 must be activated at the same time, so that a circuit can be formed between the supply line 78, the consumer 80 and the supply line 79. The functional sequence for such a control device 72 can be effected for example as described below.

After the control device 72 has been activated, i.e. the power source 73 has been activated, a control signal is sent to the individual generators, particularly to the high frequency generator 84 and the two low frequency generators 86, 88 via lines 91 to 93, by a control device 90, which for example corresponds to an on-board computer of the vehicle 30. By means of the control signals the individual generators are now activated, i.e. they trigger the individual switch devices 81 to 83 at the corresponding frequency which can be previously set for each individual generator. This is visible at point in time 94 in FIG. 13.

At point in time 94, i.e. upon activation of the control device 72, all the switch devices 81 to 83 are activated, so that a circuit can be built up via the supply line 78 to the supply line 79 and thus the consumer 80 is supplied with power. Due to this circuit, the lighting device 4 now begins to illuminate.

As however the individual switch devices 81 to 83 are triggered at different frequencies, triggering of the lighting element 4 by a combination of the individual pulses as schematically shown in FIG. 12 and visible by various lines in the diagrams, i.e. by means of activation of a switch device 83 at a set frequency of for example 1 Hz, the switch device 83 is activated over a period of time 95, so that a current flow is possible from output 87 of the switch device 82 to the output 89 of the switch device 83 over this period of time 95.

As however the switch device 82 is activated at a different frequency from the switch device 83, during the period of time 95 a plurality of the pulses 96, shown in dotted lines, and corresponding to the switch device 82 are formed. These pulses 96 have a different period of time 97 compared to the period of time 95, i.e. by means of the individual pulses 96 pulsed operation of the lighting device 1 is formed within the period of time 95 of the switch device 83. As however the switch device 81 is disposed between the converter device 77 and the switch device 82, the consumer 80 cannot be supplied with power when the switch device 81 is deactivated. Due to the high frequency triggering of switch device 81, now, as shown symbolically in FIG. 12, a high frequency voltage is generated at the output 85, so that the supply of consumer 80 basically occurs via the high frequency voltage, this however supplying the consumer 80 with power only in those points of time at which all the switch devices 81 to 83 are activated, i.e. now the high frequency voltage is applied at consumer 80 when the switch device 82 forms a pulse 96 over the period of time 97 and simultaneously the switch device 83 is activated over the period of time 95. By means of such a control method, the individual pulses 96 are formed with high frequency pulses 98 from the switch device 81, i.e. these over the period of time 97, containing the pulses 96, contain the high frequency pulses 98, and thus forms a combination of the individual frequencies of the most varied control devices 81 to 83 providing power to the consumer 80.

It should be mentioned in this respect that it is naturally possible for the generators, particularly the high frequency generator 84 and the two low frequency generators 86, 88 to be differently set via the control appliance 90, i.e. via the control lines 91 to 93 a corresponding signal is transmitted, so that on the basis of this signal the individual generators are set. As is shown by the design for the flashing device 31 illustrated in FIGS. 12 and 13, after expiry of the period of time 95 the switch device 83 is deactivated over a period of time 99. Because the switch device 83 is deactivated, supply of power to the consumer 80 from the converter device 77 is no longer possible, so that the lighting element 4 is likewise deactivated, i.e. the lighting element 4 no longer illuminates.

Within the period of time 99, however, both switch devices 81, 82 are further triggered by the generators, particularly by the high frequency generator 84 and the low frequency generator 86, so that the signal shown symbolically are formed; due to the deactivation of switch device 83, however, these cannot be applied to the consumer 80.

After the time period 99 has expired, switch device 82 is then activated by the low frequency generator 88, so that a current flow can take place via the switch device 83, as visible at time point 100 in the diagram in FIG. 13. By means of activation of switch device 83 over the time period 95, the individual switch devices 81 to 83 are applied in combination with the different frequencies to the consumer 80, particularly to the lighting element 4, so that this latter can begin to illuminate over the time period 95.

As a frequency of e.g. 1 Hz is set in the low frequency generator 88, it can now be stated that the lighting device 1 begins to flash at a rhythm of 1 Hz. Naturally it is possible, by setting the low frequency generator 88 for example at 0 Hz, thus to set a continuous interconnection or the switch device 83, so that continuous operation of lighting device 1 can take place. In continuous operation, the lighting element 4 is triggered by a pulse 96 formed by the low frequency generator 86 with the time period 97. Thus for example it is possible for the low frequency generator 96 to have a frequency of 20 Hz. This frequency has proved advantageous as due to the inertia of the lighting element 4 and the corresponding frequency of e.g. 20 Hz, flickering at the lighting device 1 is not perceptible by the eye of a person, so that a constant illumination of the lighting device 1 is provided over the time period during which the switch device 83 is closed.

Naturally it is possible with such a control device 72 that different time durations for triggering the switch device 81 to 83 can be set in operation, i.e. for example upon first activation of the switch device 83, the duration 95 for example comes to 1 second, and after deactivation of the switch device 83 the duration 99 can come to 2 seconds and then upon frequent activation of the switch device 83 the time period 95 can come to 3 seconds.

The advantage of such triggering resides in the fact that, due to the low frequency supply of the consumer 80, particularly the lighting device 1, in a frequency rhythm of the switch device 82 a longer life duration is achieved for the lighting element 4, as this is not continuously supplied with power, but after expiry of the period 97 a rest phase is provided for the lighting element 4.

Naturally it is possible to use any other optional embodiment of a control device 72 for triggering the consumer 80, particularly the lighting device 1, as is known from prior art. For this purpose it is for example possible to control triggering via a microprocessor circuit with corresponding amplifiers to supply the lighting device 1, It is also possible, instead of a plurality of switch devices 81 to 83, to use only one switch device, i.e. the switch device 81, so that continuous supply of the consumer 80 with the high frequency voltage, i.e. with the high frequency pulses 98 can be carried out.

FIG. 14 shows a further embodiment of a construction of a lighting device 1.

In this case the construction has a frame 101 surrounding the lighting element 4. The frame 101 can for example be formed by plastic or aluminium, this frame 101 being preferably in a U-shape. It is now possible within the frame 101 to dispose on the light-emitting side 102 a glass 103 or a transparent film, which can be either smooth or structured. Naturally it is possible to use a prismatic film in order to obtain a better light intensity of the lighting device 1.

There is then disposed on the glass 103 on the side of the glass 103 facing away from the light-emitting side 102, the lighting element 4 with the known layers constructed as in the FIGS. 1 to 13 previously described. In order now that the lighting element 4 is pressed against the glass 103 or against the film, a pressure plate 104 can be disposed behind the lighting element 4. It is also possible to apply a reflective layer, in particular a chromium layer to the pressure plate 104, so that a reflection of the light beams 63 emitted with respect to the light-emitting side 102 can be reflected in such a way that they in turn are deflected in the direction of the light-emitting side 102, so that even better emission and light intensity of the lighting element 4 is achieved.

Connecting with the pressure plate 104 it is now possible to dispose the switch device 72 in a compact fashion. For this purpose the switch device 72 has a printed circuit board 105 with the components 106 located on said printed circuit board 105. The control device 72, which is disposed on the side of the pressure plate 104 opposite the light-emitting side 102, corresponds to the construction of the switch device 72 as described in FIG. 12. Naturally it is possible to provide any other optional circuit construction.

It has proved advantageous, when the switch device 72 is used with respect to the lighting element 4, to construct it in a hybrid fashion or to have the individual components constructed as thinly as possible, so that a low thickness 107 is achieved for the frame 101 or for the lighting device 1 produced in a compact manner. In this respect it is for example also possible for the converter device 75, when a transformer is used, to be produced in the form of planar transformers.

In order now that the individual structures and layers are securely positioned in the frame 101, a resilient member 108 as known from prior art can be used between the U-shaped frame 101 and the printed circuit board 105. By means of this resilient member 108, the individual layers are pressed in the direction of the light-emitting side 102, avoiding the occurrence of cavities between the individual layers of the lighting device 1.

The advantage of such a structure of the lighting device 1 now resides in the fact that due to the compact construction and low thickness 107, the lighting device 1 may be used at any optional point on the vehicle or in those areas wherever anything has to be illuminated. For this purpose it is merely necessary for the compact lighting device 1 to be connected by cables to a power source, so that no additional appliances and structures are necessary for controlling the lighting device 1.

Furthermore it is possible, in order better to fix the lighting deice on an object, to provide a cover plate 109. This cover plate is secured on the side opposite the light-emitting side 102 on the frame 101 of the lighting device 1. By means of this cover plate it is now possible to make the lighting device 1 watertight, so that the lighting device 1 may be used in the open air. A further advantage results from the use of a cover plate 109, as in this way a flat surface is provided, so that simple attachment of the lighting device 1 is possible.

Naturally it is possible to design the frame 101, the cover plate 109 and the layers located in the frame 101 as flexible, so that the lighting device 1 may be attached to any optional shape, It is further possible to produce such a compact construction of the lighting device 1 without the control device 72, in this case the resilient member 108 not being provided on the printed circuit board 106, but on the pressure plate 104, so that a considerably thinner construction is achieved.

It is further possible to have the supply and/or triggering device 25 designed as a semiconductor component and to locate it on the lighting element 4 and/or carrier film 7. Naturally it is also possible for the supply and/or triggering device 25 to have an interval switch for triggering the lighting element 4.

It is further possible to have the lighting device, in particular the lighting element 4, triggered by the supply and/or triggering device 25 in different ways for day and night operation, i.e. the light intensity of the lighting device 1 is altered for day and night operation, the light intensity being increased in this respect for day operation, so that easier or better recognition of the illuminated lighting element 4 is achieved.

As a matter of order it should be pointed out that, in the drawings, individual components and component groups are shown out of proportion and distorted in scale for better understanding of the invention.

In addition, individual features of the individual embodiments may form, with other individual features of other embodiments, or respectively on their own, the subject-matter of independent invention.

Above all, the individual construction in FIG. 1; 2; 3 to 7; 8; 9; 10, 11; 12, 13; and 14 can form the subject-matter of independent solutions according to the invention. The object and solutions according to the invention in this respect are to be seen in the detailed descriptions of these Figures.

LIST OF REFERENCE NUMBERS

| | |
|---|---|
| 1. | lighting device |
| 2. | receiving means |
| 3. | casing portion |
| 4. | lighting element |
| 5. | film |
| 6. | intermediate layer |
| 7. | carrier film |
| 8. | front edge |
| 9. | surface |
| 10. | reflectors |
| 11. | reflective coating |
| 12. | surface |
| 13. | cover layer |
| 14. | surface |
| 15. | surface |
| 16. | front surface |
| 17. | protective layer |
| 18. | reflectors |
| 19. | covering layer |
| 20. | connecting layer |
| 21. | contact terminal |
| 22. | contact terminal |
| 23. | cable |
| 24. | cable |
| 25. | supply and/or triggering device |
| 26. | power source |
| 27. | thickness |
| 28. | depth |
| 29. | rear of vehicle |
| 30. | vehicle |
| 31. | flashing device |
| 32. | brake light |
| 33. | brake light |
| 34. | frame |
| 35. | vehicle chassis |
| 36. | roof |
| 37. | vehicle door |
| 38. | vehicle door |
| 39. | reversing light |
| 40. | rear light |
| 41. | rearview mirror |
| 42. | rear view mirror |
| 43. | sun-shade |
| 44. | mirror |
| 45. | surface |
| 46. | recess |
| 47. | flap |
| 48. | joint arrangement |
| 49. | inner side |
| 50. | cut-out |
| 51. | cross piece |
| 52. | external mirror |
| 53. | casing |
| 54. | mirror surface |
| 55. | mirror device |
| 56. | glass |
| 57. | surface |
| 58. | mirror layer |
| 59. | free space |
| 60. | arrow |
| 61. | layer |
| 62. | deflecting layer |
| 63. | light beam |
| 64. | angle |
| 65. | thickness |
| 66. | retaining device |
| 67. | front surface |
| 68. | rear surface |
| 69. | outer side |
| 70. | recess |
| 71. | area |
| 72. | control device |
| 73. | power source |
| 74. | cable |
| 75. | cable |
| 76. | support condenser |
| 77. | converter device |
| 78. | supply cable |
| 79. | supply cable |
| 80. | consumer |
| 81. | switch device |
| 82. | switch device |
| 83. | switch device |
| 84. | high-frequency generator |
| 85. | output |
| 86. | low-frequency generator |
| 87. | output |
| 88. | low-frequency generator |
| 89. | output |
| 90. | control appliance |
| 91. | cable |
| 92. | cable |
| 93. | cable |
| 94. | point in time |
| 95. | duration |
| 96. | pulse |
| 97. | duration |
| 98. | high-frequency pulse |
| 99. | duration |
| 100. | point in time |
| 101. | frame |
| 102. | light-emitting side |
| 103. | glass |
| 104. | pressure plate |
| 105. | printed circuit board |
| 106. | components |
| 107. | thickness |

-continued

LIST OF REFERENCE NUMBERS

| 108. | resilient member |
| 109. | cover plate |

What is claimed is:

1. An external mirror assembly for an automotive vehicle comprising:

a shell having an aperture;

a mirror carried by said shell, substantially occluding said aperture; and a first lighting element comprising an electoluminescent film electrically connected to a triggering device for energizing said electro luminescent film, said triggering device comprising a first switch device for generating a series of high frequency pulses, a second switch device for generating a series of low frequency pulses, a power source connected in series to said first and second switches for supplying power to each of said first and second switches, and a control device connected to each of said first and second switches for selectively and independently triggering each of said first and second switches to illuminate said first lighting element in one of a flashing pattern or continuous illumination.

2. A mirror assembly as set forth in claim 1 wherein said triggering device further includes a third switch connected in series to said first and second switch for generating a series of low frequency pulses when powered by said power source and selectively controlled by said control device to illuminate said first lighting element in one of a flashing pattern or continuous illumination.

3. A mirror assembly as set forth in claim 2 wherein said triggering device further includes a high frequency generator electrically connected between said control device and said first switch device for triggering said first switch at a predetermined high frequency in response to activation of said control device.

4. A mirror assembly as set forth in claim 3 wherein said triggering device further includes a first low frequency generator electrically connected between said control device and said second switch for triggering said second switch at a predetermined low frequency in response to activation of said control device.

5. A mirror assembly as set forth in claim 4 wherein said triggering device further includes a second low frequency generator electrically connected between said control device and said third switch for triggering said third switch at a predetermined low frequency in response to activation of said control device.

6. A mirror assembly as set forth in claim 5 wherein said triggering device further includes a converter device for converting direct current from said power source to voltage for supplying said predetermined frequency to each of said switches for illuminating said first lighting element.

7. A mirror assembly as set forth in claim 6 wherein at least a portion of said mirror is a dichroic mirror and said electroluminescent film is mounted within said shell adjacent said mirror to illuminate through said dichroic mirror.

8. A mirror assembly as set forth in claim 7 wherein said electroluminescent film comprises an electroluminescent layer for illuminating said mirror assembly in a predetermined directional signaling pattern.

9. A mirror assembly as set forth in claim 8 wherein said mirror assembly further comprises a second lighting element mounted on an exterior surface of said shell and operatively connected to said triggering device.

10. A mirror assembly as set forth in claim 9 wherein said triggering device energizes and illuminates said first lighting element and said second lighting element at said predetermined signaling frequencies.

11. A mirror assembly as set forth in claim 10 wherein said first switch operates at a frequency range of between 500 Hz and 50 KHz.

12. A mirror assembly as set forth in claim 11 wherein said second switch operates at a frequency range of between 10 Hz and 50 Hz.

13. A mirror assembly as set forth in claim 12 wherein said third switch operates at a frequency range of between 0 Hz and 10 Hz.

* * * * *